US006197384B1

(12) United States Patent
Schubert et al.

(10) Patent No.: US 6,197,384 B1
(45) Date of Patent: Mar. 6, 2001

(54) HYDROPHOBIC PRECIPITATED SILICA

(75) Inventors: Jürgen Schubert, Gründau; Wolfgang Lortz, Wächtersbach, both of (DE)

(73) Assignee: Degussa-Huls AG, Frankfurt am Main (DE)

( * ) Notice: Subject to any disclaimer, the term of this patent is extended or adjusted under 35 U.S.C. 154(b) by 0 days.

(21) Appl. No.: 09/344,508

(22) Filed: Jun. 25, 1999

(30) Foreign Application Priority Data

Jun. 25, 1998 (DE) .............................................. 198 28 364

(51) Int. Cl.$^7$ ................................. B01J 8/00; B05D 7/00
(52) U.S. Cl. ......................... 427/419; 428/405; 516/117
(58) Field of Search ................................... 516/117, 100; 428/405; 427/219, 220; 162/158

(56) References Cited

U.S. PATENT DOCUMENTS

| 4,208,316 | * | 6/1980 | Nauroth et al. | 428/405 |
| 4,307,023 | * | 12/1981 | Ettlinger et al. | 106/490 |
| 4,514,231 | | 4/1985 | Kerner et al. | 106/445 |
| 4,704,414 | * | 11/1987 | Kerner et al. | 106/490 |
| 5,034,207 | * | 7/1991 | Kerner et al. | 423/339 |
| 5,123,964 | * | 6/1992 | Kerner et al. | 106/287.34 |
| 5,256,196 | * | 10/1993 | Chjonowski et al. | 106/490 |
| 5,458,923 | * | 10/1995 | Geobel et al. | 427/387 |
| 5,711,797 | * | 1/1998 | Ettlinger et al. | 106/287.14 |

FOREIGN PATENT DOCUMENTS

| 2201186 | * | 9/1997 | (CA). |
| 4041827 | | 7/1992 | (DE). |
| 4402370 | | 8/1995 | (DE). |
| 197 13 316 | | 11/1997 | (DE). |
| 0125418 | | 11/1984 | (EP). |
| 0538555 | | 4/1993 | (EP). |
| 0798348 | | 10/1997 | (EP). |
| 2001303 | | 1/1979 | (GB). |

* cited by examiner

Primary Examiner—Richard D. Lovering
Assistant Examiner—Daniel S. Metzmaier
(74) Attorney, Agent, or Firm—Smith, Gambrell & Russell, LLP

(57) ABSTRACT

Hydrophobic precipitated silica having the physical/chemical parameters:

| Drying loass | [%] | 2.0–10 | DIN ISO 787/2 |
| Ignition loss | [%] | 2–25 | DIN ISO 3262/11 |
| Methanol wettability | [%] | 20–80 | titrated |
| Carbon content | [%] | 1–30 | — | is produced by mixing a precipitated silica suspension with a silane emulsion and drying it. The hydrophobic precipitated silica may be used for the production of defoamers and in papermaking.

8 Claims, No Drawings

HYDROPHOBIC PRECIPITATED SILICA

INTRODUCTION AND BACKGROUND

The present invention relates to a hydrophobic precipitated silica, to a process for the production thereof and to the use thereof.

It is known to hydrophobize precipitated silicas, wherein a wide variety of hydrophobizing agents may be used such as those described in the following: U.S. Pat. No. 3,567,680, DE-AS 24 35 860, GB-A 2 001 303, German patent 15 67 449, DE-AS 11 72 245, DE-B 25 13 608, DE-B 10 74 559, DE-B 12 29 504, EP-A 0 658 523. Thus, the term "hydrophobizing agent" with respect to silica technology is well understood as to its scope and meaning.

Known processes have the disadvantage that two or more stages must sometimes be used, during which the hydrophilic precipitated silica must first be dried and then is not reacted with the silane until a subsequent heat treatment stage; either that or very long reaction times are required despite elevated temperatures.

Moreover, if uniform hydrophobization of the precipitated silica is to be achieved, the precipitated silica must be homogeneously mixed with the silane. However, homogeneous mixing is not possible when an aqueous precipitated silica suspension is used because it is not possible to achieve a homogeneous distribution of the silane due to its hydrophobic properties.

It is therefore an object of the present invention to provide a hydrophobic precipitated silica which does not exhibit these disadvantages.

SUMMARY OF THE INVENTION

The above and other objects can be achieved according to the present invention which provides a hydrophobic precipitated silica which is characterized by the following physical/chemical parameters:

| | | | |
|---|---|---|---|
| Drying loass | [%] | 2.0–10 | DIN ISO 787/2 |
| Ignition loss | [%] | 2–25 | DIN ISO 3262/11 |
| Methanol wettability | [%] | 20–80 | titrated |
| Carbon content | [%] | 1–30 | — |

The present invention also provides a process for the production of the hydrophobic precipitated silica, which process is characterized in that an aqueous precipitated silica suspension is produced and is mixed with an aqueous silane emulsion and this mixture is then dried.

The mixture may be produced in batches. In another embodiment of the invention, once the precipitated silica emulsion and the silane emulsion have passed through a mixing section, they can simultaneously be fed into a spray dryer.

In a preferred embodiment of the invention, the mixture can be dried by means of a spray dryer.

Another option for performing mixing and drying is drying by means of a spin/flash dryer.

DETAILED DESCRIPTION OF INVENTION

The present invention will now be described in further detail. Any known precipitated silica may be used as the precipitated silica for purposes of this invention. Such precipitated silicas and the production thereof are described, for example, in Winnacker-Küchler, *Chemische Technologie,* volume 3, 4th edition, page 82 (1983) and in *Ullmanns Encyklopädie der technischen Chemie,* volume 21, 4th edition (1982), pages 465 et seq.

In a preferred embodiment, VN3 may be used as the precipitated silica. VN3 is known from the above-mentioned Ullmann, page 467, table 12 which is relied on and incorporated herein by reference. Precipitated silica VN3 and further precipitated silicas usable according to the invention are known from the publication *"Fällungskieselsäuren und Silikate, Herstellung, Eigenschaften und Anwendung"*, Degussa Aktiengesellschaft, September 1983.

Emulsions known from the document EP-B 0 538 555 as well as mixtures of different silane emulsions may be used as the aqueous emulsions of silanes. The entire disclosure of EP-B 0538 555 is relied on and incorporated herein by reference.

Such emulsions known from document EP-B 0 538 555 are aqueous emulsions containing organosilicon compounds, which emulsions optionally contain anionic and/or nonionic surfactants and pH-buffering substances. They contain:

(A) 1 to 80 wt. %, in particular from 1 to 60 wt. %, relative to the total quantity, of at least one alkoxysilane of the general formula

in which
  $R_1$: means $C_1-C_3$ alkyl
  $R_3$: means $C_1-C_{20}$ alkyl, linear or branched, in particular $C_8-C_{16}$ alkyl, phenyl
  a: means 0 to 3

(B) 1 to 20 wt. %, preferably 1 to 5 wt. % of a surfactant which stabilizes the emulsion, preferably an organosilicon compound having surfactant-like properties, and (C) contains water in a quantity of 1–95 wt. %, preferably of 1–75 wt. %, wherein the quantities by weight add up to 100%.

Apart from the compounds of the formula (I), the emulsion may also contain the partial condensation products thereof, for example dimers, trimers or other oligomers, as are known to the person skilled in the art. The pH value of the emulsion is preferably adjusted to approximately 7.5.

In a particular embodiment, a buffer substance may be added to the emulsion in a quantity of 0.1 to 5 wt. %, relative to the entire quantity of the emulsion. This substance comprises, for example, sodium hydrogen carbonate, sodium carbonate or trisodium phosphate.

In another preferred embodiment, 0.2 to 8.0 wt. %, relative to the total weight of the emulsion, of one or more known anionic surfactants are also added to the emulsion. The emulsion optionally contains 0.1 to 1.0 wt. % of a known thickener, for example from the class of cellulose or starch derivatives, likewise relative to the entire quantity of the emulsion. The emulsion may optionally contain 0.2 to 5.0 wt. % of anionic and/or nonionic surfactants, preferably organosilicon compounds having surfactant properties, as described in EP-B 0 538 555.

The emulsions are preferably produced using the silanes
  (Si 208) $C_8H_{17}$—Si(OEt)$_3$ or
  (Si 216) $C_{16}H_{33}$—Si(OEt)$_3$.

The process according to the invention exhibits the following advantages:

The process according to the invention may be directly connected to any known process for the production of a hydrophilic silica. The drying step in the spray dryer may simultaneously be used as the step for reacting the silica with the silane. Combined spraying of the silica suspension and the silane emulsion ensures homogeneous surface modification of the silica particles and thus a narrow distribution of the degree of hydrophobization. The very short reaction time in the spray dryer minimizes the period for which the silane is exposed to elevated temperatures.

The precipitated silica according to the invention may be used for the production of defoamers and in papermaking.

EXAMPLES

Reaction of organosilanes with the precipitated silica Sipernat® 22 brand of Degussa-Hüls AG.

Aqueous emulsions of the organosilanes Si 208 and Si 216 are used for surface modification of the silica. Si 208 comprises triethoxyoctylsilane and Si 216 comprises triethoxyhexadecylsilane. The standard aqueous emulsions of these silanes are designated WS 405 for Si 208 and WS 431 for Si 216. The droplet size of the silanes in the aqueous emulsion is approx. 0.5 $\mu$m.

| Silane | Empirical formula | Aqueous emulsion | Silane content |
|---|---|---|---|
| Si 208 | $(EtO_3)Si(CH_2)_7CH_3$ | WS 405 | 500 g/l |
| Si 216 | $(EtO_3)Si(CH_2)_{15}CH_3$ | WS 431 | 500 g/l |

A suspension of Sipernat 22 was used for the reaction with silanes by spray drying.

| | |
|---|---|
| Solids content: | 20.4 wt. % |
| Surface area: | 194 m$^2$/g |
| SiOH conc.: | 1.08 mmol/g |
| Particle size, $d_{50}$: | 28.09 $\mu$m |

The number of Si—OH groups on the surface of the silica is of vital significance for the reaction of the silane with precipitated silica Sipernat 22. The stoichiometric ratios of the desired reaction of silanes with precipitated silica are accordingly related to 1 mol of Si—OH of the silica, even though, due to possible polycondensation of the silanes among themselves, this stoichiometry need not necessarily correspond to the actual reaction.

The suspension of the precipitated silica Sipernat 22 is combined in batches with the aqueous emulsion of the silane before the spray drying such that the ratios of silane to Si—OH stated in the following table are obtained. Immediately thereafter, the mixture is spray dried. Mixing may also proceed continuously after passage through a mixing section in a StaticMix® unit. Both components are here fed simultaneously into the spray dryer.

Results
Degree of Hydrophobicity

The degree of hydrophobicity is determined by titration. To this end, 0.2 g of the sample are weighed out into a 250 ml separating funnel and 50 ml of ultrapure water are added. The silica remains on the surface. Methanol is then added ml by ml from a burette. During addition, the separating funnel is shaken with a circular hand motion in such a manner that no vortices are formed in the liquid. Methanol is added in this manner until the powder is wetted. Wetting is recognised by all the powder sinking below the water surface. The quantity of methanol consumed is converted into wt. % of methanol and stated as the value for methanol wettability.

Tables 1 and 2 state the methanol wettability determined in this manner for the precipitated silica reacted with organosilanes.

TABLE 1

Methanol wettability of silica hydrophobized with WS 405.

| mol SiOH : mol silane | 1 : 1 | 1 : 2 |
|---|---|---|
| Type of feed | StaticMix | StaticMix |
| Methanol wettability [%] | — | 20 |

TABLE 2

Methanol wettability of silica hydrophobized with WS 431

| mol SiOH : mol silane | 1 : 0.5 | 1 : 0.5 | 1 : 1 |
|---|---|---|---|
| Type of feed | StaticMix | Batch | StaticMix |
| Methanol wettability [%] | 59 | 56 | 67 |

Methanol wettability values of 60–70% may be achieved by the reaction of organosilanes. Both in the reactions with organosilane Si 208 and in those with Si 216, the degree of hydrophobicity rises with a rising silane content in the spray dryer feed.

In comparison with the silica hydrophobized with Si 208, the reactions performed with Si 216 result in more hydrophobic products given the same stoichiometry. The highest value of 65% is achieved for the SiOH:silane reaction ratio of 1:1.

C Content

The C content is proportional to the number of silane molecules directly chemically bonded to the silica surface or indirectly bonded by silane polycondensation.

TABLE 3

Carbon content of silica hydrophobized with WS 405

| mol SiOH : mol silane | 1 : 1 | 1 : 2 |
|---|---|---|
| Type of feed | StaticMix | StaticMix |
| Methanol wettability [%] | 4.4 | 5.9 |

TABLE 4

Carbon content of silica hydrophobized with WS 431

| mol SiOH : mol silane | 1 : 0.5 | 1 : 0.5 | 1 : 1 |
|---|---|---|---|
| Type of feed | StaticMix | Batch | StaticMix |
| Methanol wettability [%] | 10.8 | 10.2 | 17.5 |

As expected, the C content increases with a rising silane content in the spray dryer feed.

TABLE 5

Analytical data for silica reacted with WS 405 and produced in the spray dryer

| Reaction ratio | [mol OH: mol silane] | 1 : 1 | 1 : 2 |
|---|---|---|---|
| Type of feed |  | StaticMix | StaticMix |
| Drying loss | [%] | 3.9 | 3.5 |
| Ignition loss | [%] | 8.9 | 11.2 |
| DBP | [g/100 g] | 230 | 218 |
| Average particle size | [μm] | 33.2 | 30.3 |
| BET surface area | [m²/g] | 143 | 128 |
| Sears index | [ml] | 16.9 | 14.4 |
| C content | [%] | 4.4 | 5.9 |
| Methanol wettability | [%] | — | 20 |

TABLE 6

Analytical data for silica reacted with WS 431 and produced in the spray dryer

| Reaction ratio | mol OH : mol silane | 1:0.5 | 1:0.5 | 1:1 |
|---|---|---|---|---|
| Type of feed |  | StaticMix | Batch | StaticMix |
| Drying loss | [%] | 4.5 | 3.1 | 4.3 |
| Ignition loss | [%] | 16 | 15.9 | 25.5 |
| DBP | [g/100 g] | 181 | 218 | 155 |
| Average particle size | [μm] | 36.4 | 37.1 | 35.7 |
| BET surface area | [m²/g] | 102 | 99 | 73 |
| Sears index | [ml] | 11.8 | 14.2 | 9.7 |
| C content | [%] | 10.8 | 10.2 | 17.5 |
| Methanol wettability | [%] | 59 | 56 | 67 |

Measurement Methods for Determining Physical/chemical Parameters

Drying loss to DIN ISO 787/2, ASTM D 280 JIS K 5101/21

Ignition loss to DIN ISO 3262/11, ASTM D 1208, JIS K 5101/23, relative to substance dried for 2 h at 105° C.

Carbon Content

Quantitative determination using LECO-CS 244 elemental analyser.

Further variations and modifications of the invention will be apparent to those skilled in the art from the foregoing and are intended to be encompassed by the claims appended hereto.

German priority application 198 28 364.4 is relied on and incorporated herein by reference.

We claim:

1. A process for the production of a hydrophobic precipitated silica having the following physical/chemical parameters:

| Drying loss | (DIN ISO 787/2) | 2.0–10% |
|---|---|---|
| Ignition loss | (DIN ISO 3262/11) | 2–25% |
| Methanol wettability | (titrated) | 20–80% |
| Carbon content |  | 1–30% | comprising passing an aqueous precipitated silica suspension and an aqueous silane emulsion through a mixing section; simultaneously feeding said precipitated silica suspension and said silane emulsion into a spray dryer for reacting said silica with said silane and drying the resulting mixture.

2. The process according to claim 1 wherein said silane emulsion comprises:
   (A) 1 to 80 wt. %, relative to the total quantity, of at least one alkoxysilane of the formula $$(R_1O)_{4-a}Si(R_3)_a \tag{I}$$

in which
   $R_1$: means $C_1$–$C_3$ alkyl
   $R_3$: means $C_1$–$C_{20}$ linear or branched alkyl, or phenyl
   a: means 0 to 3
   (B) 1 to 20 wt. %, of a surfactant which stabilizes the emulsion, and
   (C) contains water in a quantity of 1–95 wt. % wherein the quantities by weight add up to 100%.

3. The process according to claim 2 wherein the surfactant is an organosilicon compound having surfactant properties.

4. The process according to claim 2 wherein the silane is $C_8H_{17}$—Si (OEt)$_3$ or $C_{16}H_{33}$—Si (OEt)$_3$.

5. The process according to claim 2 wherein said alkoxysilane is present in an amount of 1 to 60% by weight.

6. The process according to claim 2 wherein $R_3$ in $C_8$–$C_{16}$ alkyl.

7. The process according to claim 2 wherein the surfactant is present in an amount of 1 to 5% by weight.

8. The process according to claim 2 wherein water is present in an amount of 1 to 75% by weight.

* * * * *